United States Patent
Donoho

(10) Patent No.: US 9,339,024 B2
(45) Date of Patent: May 17, 2016

(54) ROTATABLE BIRD DETERRENT DEVICE

(71) Applicant: Bird-B-Gone, Inc., Mission Viejo, CA (US)

(72) Inventor: Bruce Donoho, Mission Viejo, CA (US)

(73) Assignee: Bird-B-Gone, Inc., Mission Viejo, CA (US)

( * ) Notice: Subject to any disclaimer, the term of this patent is extended or adjusted under 35 U.S.C. 154(b) by 224 days.

(21) Appl. No.: 14/133,285

(22) Filed: Dec. 18, 2013

(65) Prior Publication Data

US 2014/0224171 A1  Aug. 14, 2014

Related U.S. Application Data

(60) Provisional application No. 61/739,956, filed on Dec. 20, 2012.

(51) Int. Cl.
| *A01M 29/06* | (2011.01) |
| *A01M 29/08* | (2011.01) |
| *A01M 31/06* | (2006.01) |
| *G09F 15/00* | (2006.01) |

(52) U.S. Cl.
CPC .............. *A01M 29/06* (2013.01); *A01M 29/08* (2013.01); *A01M 31/06* (2013.01); *G09F 15/00* (2013.01)

(58) Field of Classification Search
CPC ....... G09F 15/00; A01M 31/06; A01M 29/06; A01M 29/08
USPC ................. 116/22 A, 22 R, DIG. 7–DIG. 9; 40/406–407, 411–412, 418–420, 440, 40/479, 493; 340/573.2; 119/713; 446/228–229, 30–31; 43/2
See application file for complete search history.

(56) References Cited

U.S. PATENT DOCUMENTS

| 704,002 | A | * | 7/1902 | Cribs et al. | G09F 7/22 |
| | | | | | 40/479 |
| 3,292,319 | A | | 12/1966 | McCarthy | |
| 4,074,653 | A | | 2/1978 | Pember | |
| D328,806 | S | | 8/1992 | Tucket et al. | |
| 5,343,651 | A | | 9/1994 | Chatten | |
| 5,452,536 | A | | 9/1995 | Chatten | |
| 6,640,506 | B2 | | 11/2003 | Landers | |
| 6,749,394 | B2 | * | 6/2004 | Boatner | F03D 3/067 |
| | | | | | 415/140 |
| 6,941,886 | B1 | | 9/2005 | Suelzer | |
| 7,036,278 | B1 | | 5/2006 | Donoho | |
| D534,236 | S | | 12/2006 | Zecher | |
| 2007/0074467 | A1 | | 4/2007 | Zecher | |
| 2013/0014422 | A1 | | 1/2013 | Bullerdick et al. | |
| 2013/0014692 | A1 | | 1/2013 | Lee | |

FOREIGN PATENT DOCUMENTS

| AU | 642323 | 10/1993 |
| AU | 2004100879 | 11/2004 |
| AU | 2009100495 | 5/2009 |
| ES | 1067238 | 5/2008 |
| GB | 2034164 | 6/1980 |
| GB | 2316287 | 2/1998 |
| GB | 2405072 | 11/2006 |
| JP | 2013063043 | 4/2013 |
| JP | 2013070632 | 4/2013 |
| WO | 03/101192 | 12/2003 |
| WO | 2010/135771 | 12/2010 |

* cited by examiner

*Primary Examiner* — R. A. Smith
*Assistant Examiner* — Tania Courson
(74) *Attorney, Agent, or Firm* — Fish & Tsang LLP

(57) ABSTRACT

Rotatable bird deterrent devices are provided. Contemplated devices comprise at least one rotatable arm having a sail. In some embodiments, the sail has a length that is substantially perpendicular to the length of the arm. At least one stop can be provided, for example, via an end-piece, and the stop can act to block rotation of the sail.

11 Claims, 2 Drawing Sheets

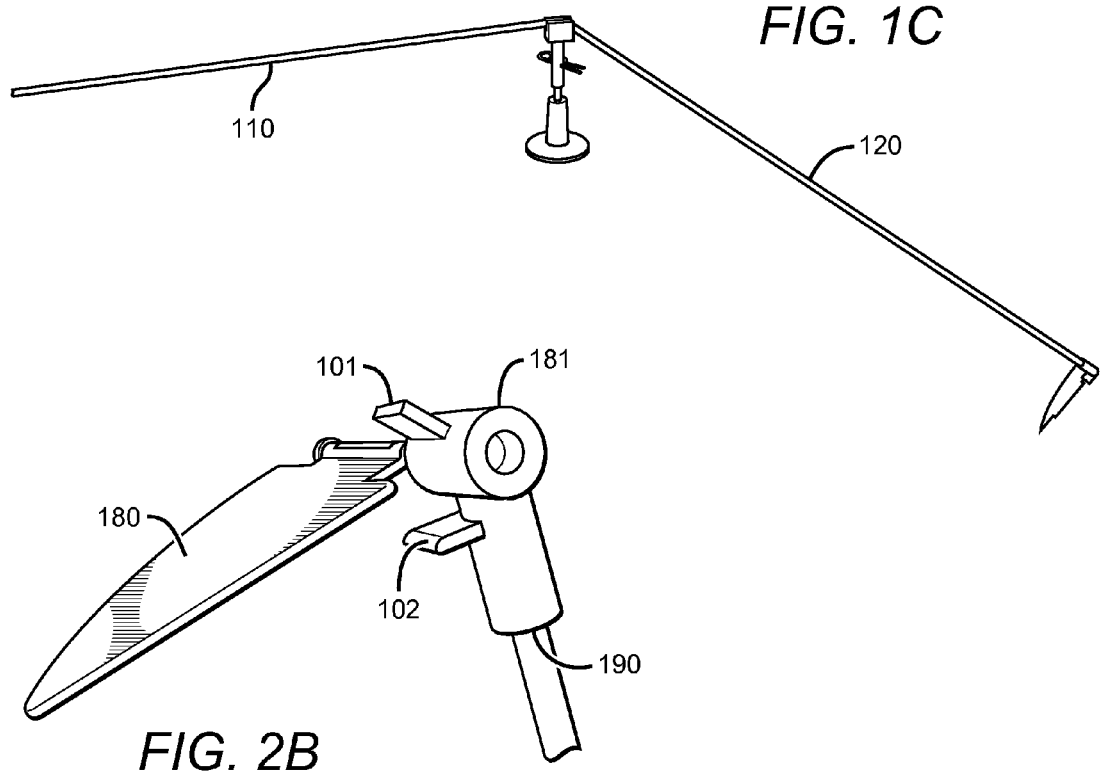
FIG. 1C
FIG. 2B
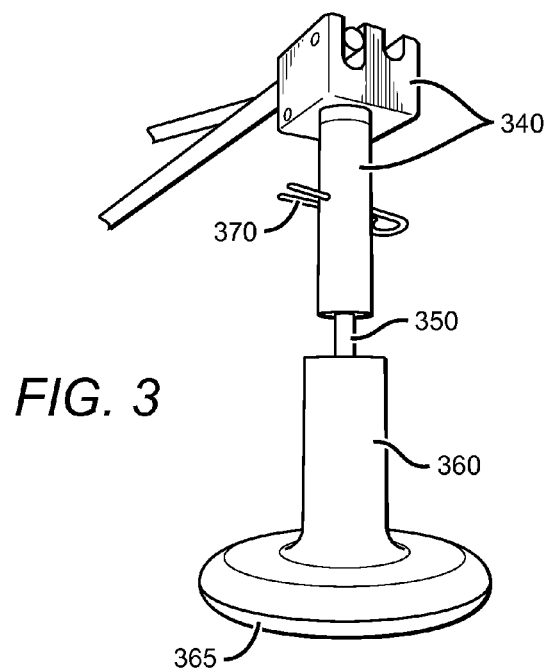
FIG. 3

ROTATABLE BIRD DETERRENT DEVICE

This application claims priority to U.S. Provisional Application Ser. No. 61/739,956 filed on Dec. 20, 2012. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is bird deterrent devices.

BACKGROUND

The following description includes information that may be useful in understanding the present invention. It is not an admission that any of the information provided herein is prior art or relevant to the presently claimed invention, or that any publication specifically or implicitly referenced is prior art.

There are numerous devices and methods known in the art to deter birds or other animals from nesting or perching on various structures. Depending on the particular bird to be deterred, and especially depending on the site of installation, the configuration of such devices may vary considerably. For example, where birds need to be deterred on a relatively confined space (e.g., a rim or ledge of a building), spikes or electric shock track may be installed.

However, spikes and electric shock track are often impractical and unsightly, and can't be removed and replaced easily. This is especially important for boats or other craft or structures where the user wants to have the bird deterrents installed on a periodic basis. For such situations, it is known to use bird deterrents having a center post and radially extending arms that rotate in the wind. Typically, such deterrents include a protective or functional terminal portion on the distal end of the arm (e.g., a sail) to better engage with the wind, act as an additional visual deterrent, and/or to provide physical protection against unintended contact. Examples for such devices are described in U.S. Patent Publication No. 2007/0074467 to Zecher, WIPO Publication No. WO 2010/135771 to Martin, U.S. Pat. Nos. 7,036,278, 6,640,506 to Landers, U.S. Pat. Nos. 5,343,651 and 5,452,536 to Chatten, U.S. Pat. No. 4,074,653 to Pember, U.S. Pat. No. 3,292,319 to McCarthy, and U.K. Patent No. 2,405,072 to Fruin.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

While the above devices prevent various birds from perching or nesting on the protected structure, various disadvantages nevertheless remain. For example, existing devices allow for substantial rotation of the sail limiting its effectiveness. Moreover, existing devices do not fully appreciate the potential versatility of rotating deterrent devices.

Thus, there is still a need for improved rotatable bird deterrent devices.

SUMMARY OF THE INVENTION

The inventive subject matter provides apparatus, systems and methods in which a bird deterrent device comprises a post extending from a base, and first and second arms extending from a support rotatably coupled to the base. The arms are preferably each configured to rotate with respect to at least a portion of the base. In some contemplated embodiments, the arms are coupled to the support and maintain a fixed relationship with respect to one another during rotation.

In other contemplated embodiments, a first arm of the device can be coupled with a first end-piece, which is also coupled with a first mast. A first sail can be rotatably secured to the first mast, and be configured to rotate about the length of the first mast. The first mast can have a length that is substantially perpendicular to a length of the first arm. In some embodiments, the second arm can be coupled with a second end-piece, which is also coupled with a second mast. A second sail can be rotatably secured to the second mast, and be configured to rotate about the second mast. The second mast can have a length that is substantially perpendicular to a length of the second arm. The sails can advantageously facilitate rotation of the bird deterrent's arms by increasing the surface area upon which wind can impinge on the sails and thereby cause rotation of the arms. In this manner, the bird deterrent's arms can be rotated without the need for an electric motor or power supply.

At least one of the first and second end-pieces can comprise one or more stops, and preferably two stops. Each of the stops can be configured to limit rotation of a sail beyond a defined range of rotation. In especially preferred embodiments, two stops can be provided on a single end-piece, and be configured to limit rotation of a sail to a range of preferably no more than 90°. It is further contemplated that the stops can limit rotation of the sail beyond a 35° angle, 45° angle, 60° angle, 90° angle (e.g., a quarter circle about or around a length of a mast), 105° angle, 170° angle, or any other suitable angle. The stops advantageously prevent further rotation of the sail beyond the desired range, and allows for rotation of the arms during stronger wind gusts. In addition, the stops help ensure that the sail can more quickly rotate and face a direction of the incoming wind to thereby facilitate rotation of the arms. Without such stops, the sail would be freely rotatable, which can limit the amount of wind energy that can be harnessed.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIGS. 1A-C illustrate one embodiment of a rotating deterrent device of the inventive subject matter in different configurations.

FIGS. 2A-2B illustrate an end-piece, mast and sail of the inventive subject matter.

FIG. 3 illustrates image of a base, post, support and pin of the inventive subject matter.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1A:
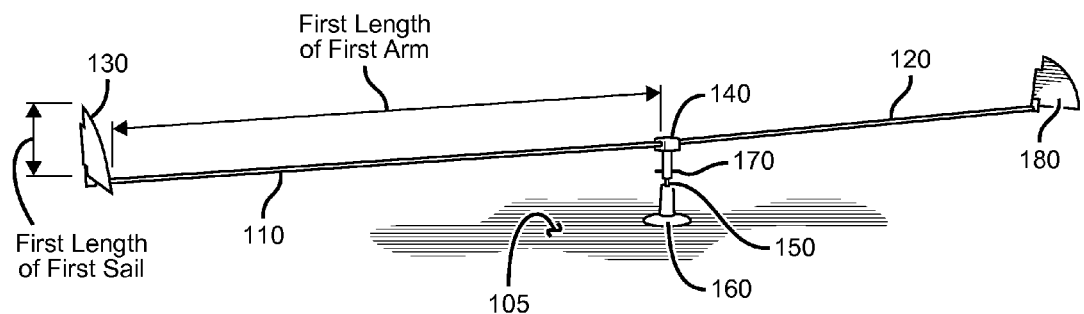
Figure 1B:
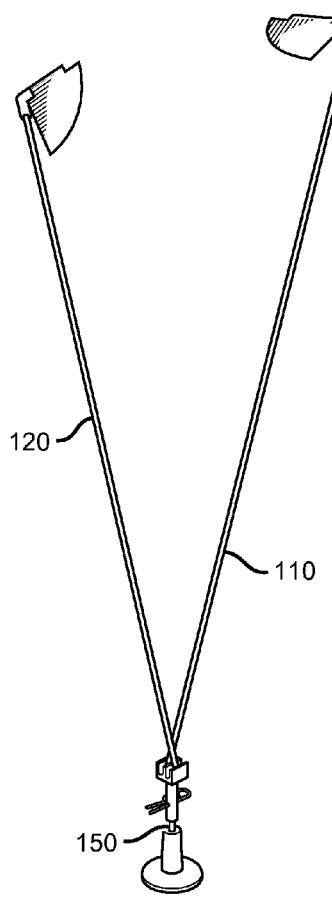

In FIGS. 1A-1C, three different configurations of a single rotatable deterrent device are shown. Each of the first arm 110 and second arm 120 can be coupled with support 140 in a manner that allows the arm (110 or 120) to change positions with respect to a surface 105. For example, where a bird deterrent device is placed on a flat surface (e.g., surface 105), it is contemplated that the length of an arm (110 or 120) can be parallel to the flat surface, perpendicular to the flat surface, or form any other angle with respect to the surface. Where the substrate is curved, it is contemplated that the length of the arm can form any suitable angle with post 150, for example, a 90° angle (as shown), among other angles.

In FIG. 1A, the arms are set substantially parallel to the surface to which it is removably or permanently attached. In other words, the arms form a substantially 90° angle with post 150. Alternatively or additionally, as shown in FIG. 1B, the arms can be set in a configuration wherein each arm forms an obtuse angle with respect to the post 150. As shown in FIG. 1C, a first arm can be set at a first position (e.g., substantially parallel to a substrate), and a second arm can be set at a second position different from the first. This angle can be an acute, right, or obtuse angle with respect to the post of the device.

In the embodiment shown in FIGS. 1A-1C, post 150 extends from base 160. First arm 110 and second arm 120 are each movably coupled to a support 140. Support 140 rotates with respect to base 160, and a portion of support 140 is configured to surround at least a portion of post 150. A first sail 130 is coupled to the first arm 110 and a second sail 180 is coupled to the second arm 120.

As used herein, the term "set" is used very broadly to include, among other things, moving towards, locked at, or passing through a configuration. Thus, in FIG. 1A, where the arms are each described as "set" substantially parallel to the substrate, it is contemplated that the word "set" can be substituted with "moved towards a configuration", "locked at a configuration" or "pass through a configuration".

Some devices of the inventive subject matter can comprise three, four, six, or even eight or more arms, which can extend from one, two, three, or even four or more supports. Each of the supports can be coupled to the base in any suitable matter. It is also contemplated that first, second, third and fourth arms can extend from a single support that is configured to rotate about a base.

At least one of an arm, a sail, a support, or a base can be extendable and retractable to provide increased versatility and mobility. Thus, it is contemplated that each arm can retract and extend in any suitable manner. For example, an arm can comprise concentric layers, wherein a layer having a smaller diameter extends in and out of a layer having a larger diameter. Alternatively, an arm can comprise multiple portions in between bending points, such that the arm can bend (e.g., in a flat zigzag configuration, etc.). Moreover, it is contemplated that one or both stops of an end-piece can be adjustable, for example, to modify the angle or position that a sail can rotate between. The adjustment mechanism that allows the stop(s) to adjust can comprise a sliding mechanism, grooves configured to accept a protrusion of a stop, or any other commercially suitable mechanism.

Figure 2A:
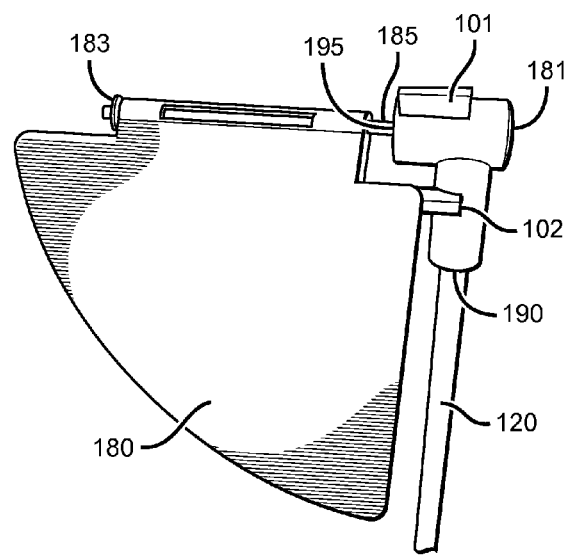

In FIGS. 2A-2B, a close up of one embodiment of the sail 180, end-piece 181 and mast 185 is shown. The end-piece of this embodiment comprises an L-shape (or substantially an L-shape), and comprises two attachment points (190, 195). However, end-pieces of all suitable shapes are contemplated. The first attachment point 190 is configured to accept a portion of an arm 120, while the second attachment point 195 is configured to accept a portion of a mast 185. A portion of the sail 180 is configured to wrap around a portion of the mast 185, and is loosely locked between the end-piece 181 and a locking mechanism 183. All commercially suitable locking mechanisms are contemplated. In FIG. 2, the locking mechanism 183 comprises a torus (flat or rounded) shaped ring that a tip of mast 185 slides through prior to being substantially flattened. This flattening of the tip prevents the ring from sliding off of the mast 185.

It is especially preferred that sail 180 is configured to rotate about or around mast 185 at a defined range of rotation between where sail 180 hits the first stop 101 and the second stop 102. This range of rotation can allow the sail 180 to rotate 30 degrees, 45 degrees, but preferably no more than 90 degrees, although the specific range of rotation will depend on the specific application and environmental factors. In FIG. 2, sail 180, first stop 101 and second stop 102 are configured such that sail can rotate approximately 90 degrees (or a quarter circle) about or around mast 185.

In some contemplated embodiments, any suitable number of arms (e.g., 2, 4, 6, 8, 10, etc.) can each comprise an end-piece, mast, stop(s), and sail similar or even identical to the ones shown and described in FIG. 2.

In FIG. 3, a close up of one embodiment of a base 360, post 350, support 340, and pin 370 (e.g., a cotter pin) is shown. Cotter pin 370 is a pin having two tips on one side and a rounded center portion on another side (similarly to a bobby pin), and is configured to secure the support to the post and the base. One tip of cotter pin 370 is configured to enter and exit a through-hole of support 340, while the other tip passes an outer portion of the support. The cotter pin is sized and dimensioned to wrap around a portion of an indented ring (not shown) of post 350 to lock support 340 at a specific height (or height range) relative to the base 360.

Base 360 comprises three mounting holes, each sized and configured to accept a screw, glue, or any other suitable mounting accessory. However, it is contemplated that any other mounting mechanism can be used, including for example, an adhesive layer on the bottom of the base or magnets. Base 360 further comprises a foam layer 365 configured to provide a protective layer between a substrate and the device.

It is contemplated that a device of the inventive subject matter can be made of any suitable material or materials. Suitable materials are preferably UV and corrosion resistant (e.g., water resistant, heat resistant, etc.) and include, for example, any type of natural or synthetic plastic, a foam, or a metal. Some contemplated deterrent devices comprise both a plastic and a metal and is resistant to rust even in the presence of large amounts of water.

Where a device comprises multiple arms, sails, posts, supports, or masts, it is contemplated that the multiples do not need to be equivalent in size or shape. For example, a device can comprise two arms having different lengths (or maximum or minimum lengths when extendable or retractable), 5 sails having different lengths, shapes and sizes, and so forth.

In some preferred embodiments, the post extends from the base while the support rotates about the post. However, it is also contemplated that the post can be movably (e.g., rotatably, pivotally, etc.) coupled with the base. For example, it is contemplated that a portion of the post can be rotatable within a portion of the base. It is also contemplated that in some embodiments, a base can comprise two or more portions wherein one portion of the base is rotatable with respect to another portion of the base.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

The invention claimed is:

1. A bird deterrent, comprising:
   a post extending from a base;
   first and second arms rotatably coupled to the post and each configured to rotate with respect to the base;
   a first end-piece coupled with the first arm and a first mast, wherein the first end-piece includes first and second stops, and wherein the first mast is footed in a substantially closed housing;
   a first sail rotatably secured to the first mast, and configured to rotate between the first and second stops;
   a second end-piece coupled with the first arm and a second mast, wherein the second end-piece comprises a third stop and a fourth stop; and
   a second sail rotatably secured to the second mast and configured to rotate between the third and fourth stops.

2. The bird deterrent device of claim 1, further comprising:
   a second arm rotatably coupled to the post and configured to rotate with respect to the base;
   a second end-piece coupled with the second arm and a second mast, wherein the second end-piece comprises a third stop and a fourth stop; and
   a second sail rotatably secured to the second mast, and configured rotate between the third and fourth stops.

3. The bird deterrent of claim 2, wherein the first arm has a first length, and wherein the second arm has a second length that is greater that the first length.

4. The bird deterrent of claim 2, wherein the first and second arms are each configured to rotate with respect to the post.

5. The bird deterrent of claim 1, wherein at least one of the first and second sails is an extendible sail.

6. The bird deterrent of claim 1, further comprising a support and a cotter pin removably coupled to the support, and configured to secure the support to the post and the base.

7. The bird deterrent of claim 1, wherein the first arm is extendable.

8. The bird deterrent of claim 1, wherein at least one of the base and post is configured such that the post is rotatable within the base.

9. The bird deterrent of claim 1, wherein the at least one of the first stop and the second stop is movably coupled with the first end-piece.

10. The bird deterrent of claim 9, further comprising a locking mechanism configured to lock the at least one of the first stop and the second stop in at least a first and second position.

11. The bird deterrent of claim 1, wherein the first end piece comprises a first lock configured to lock the first arm at a first angle relative to a surface, and wherein the first angle is between 10 degrees and 40 degrees.

* * * * *